United States Patent
Moser et al.

(10) Patent No.: US 6,173,823 B1
(45) Date of Patent: *Jan. 16, 2001

(54) VISCOUS CLUTCH ASSEMBLY

(75) Inventors: George Moser, Wixom; Gordon Sommer, Plymouth; Patrick B. Usoro; Anthony L. Smith, both of Troy, all of MI (US)

(73) Assignees: BEHR America, Inc., Walled Lake; General Motors Corporation, Detroit, both of MI (US)

(*) Notice: Under 35 U.S.C. 154(b), the term of this patent shall be extended for 0 days.

This patent is subject to a terminal disclaimer.

(21) Appl. No.: 09/415,300

(22) Filed: Oct. 8, 1999

Related U.S. Application Data (63) Continuation of application No. 09/157,481, filed on Sep. 21, 1998, now Pat. No. 6,032,772.

(51) Int. Cl.[7] .................................................. F16D 35/00
(52) U.S. Cl. ............................................ 192/21.5; 192/58.4
(58) Field of Search ........................... 192/21.5, 58.4, 192/58.61, 58.7; 188/267.1, 267.2

(56) References Cited

U.S. PATENT DOCUMENTS

| | | | |
|---|---|---|---|
| 2,822,070 | * 2/1958 | Jaeschke | 192/21.5 |
| 2,870,888 | * 1/1959 | Gill | 192/21.5 |
| 4,056,178 | 11/1977 | Defly . | |
| 4,681,197 | * 7/1987 | Pedu | 192/21.5 |
| 5,377,798 | 1/1995 | Hudson et al. . | |
| 5,598,908 | * 2/1997 | York et al. | 192/21.5 |
| 5,667,715 | 9/1997 | Foister . | |
| 5,848,678 | * 12/1998 | Johnston et al. | 192/21.5 |
| 5,896,965 | * 4/1999 | Gopalswamy et al. | 192/21.5 |
| 5,960,918 | * 10/1999 | Moser et al. | 192/58.4 |
| 6,032,772 | * 3/2000 | Moser et al. | 192/21.5 |

* cited by examiner

*Primary Examiner*—Rodney H. Bonck
(74) *Attorney, Agent, or Firm*—Harness, Dickey & Pierce, PLC (57) ABSTRACT

A viscous fluid clutch includes a rotor attached to an output from an engine, a stator attached to a fan assembly and a coil assembly having at least a portion attached to the stator. A first gap is defined between the rotor and the stator and a second gap is defined between the rotor and the coil assembly. The first and second gaps are filled with a magneto rheological (MR) fluid. The coil assembly creates a magnetic field in the first and second gaps to vary the viscosity of the MR fluid to produce a variable speed viscous fluid clutch. The coil assembly includes coil windings which are supplied with power through a slip ring assembly. Both the coil windings and the wiring between the slip ring assembly and the coil windings are isolated from the magneto rheological fluid.

15 Claims, 7 Drawing Sheets

VISCOUS CLUTCH ASSEMBLY

This is a continuation of U.S. patent application Ser. No. 09/157,481, filed Sep. 21, 1998 and now U.S. Pat. No. 6,032,772.

FIELD OF THE INVENTION

The present invention relates generally to viscous fluid clutches for automotive fans. More particularly, the present invention relates to electrically controlled viscous clutch assemblies which utilize a magnetorheological (MR) fluid.

BACKGROUND OF THE INVENTION

The use of a viscous fluid clutch for controlling the rotation of an engine cooling fan for a vehicle is well known in the art. A multi-blade fan is removably secured to a viscous fan clutch installed between an accessory pulley (typically the water pump pulley) of a vehicle and a radiator. The viscous clutch is designed to drive the fan at high speeds which can approach the input speed of the viscous clutch which is normally the rotational speed of the engine. The operation of the viscous clutch is controlled based upon the engine's operating temperature to drive the fan approaching engine speeds when cooling is required and the viscous clutch permits the fan to operate at low speeds when cooling is not required. The thermostatic control of the fan through the clutch reduces airflow noise caused by fan rotation and load on the engine which provides the benefit of increased horsepower and improved fuel economy.

Generally, in the prior art clutches, a clutch plate housed within the clutch assembly, having lands and grooves, is mated to a housing having complimentary lands and grooves. An internally contained pump plate separates a working chamber from a reservoir. Gates in the pump plate permit selective flow of a viscous fluid from the reservoir to the working chamber and into a shear zone between the lands and grooves of the housing and the clutch plate. Fluid shear in the lands and grooves transfers input torque from the clutch plate to drive the housing and the attached fan.

When cooling is not required, gates in the pump plate are closed and the fluid in the shear zone is pumped into the working chamber. Orifices in the pump plate permit passage of the fluid from the working chamber to the reservoir. The removal of a majority of the fluid reduces the shear between the clutch plate and the housing, thereby substantially reducing the rotation of the housing and the attached fan.

The prior art viscous clutch systems which are thermostatically controlled rely on the temperature of the air passing through the radiator or the temperature of the cooling water of the engine to switch the on/off control for the fan. While these prior art viscous fan clutches have met with wide acceptance with the automotive and truck manufacturers, closer or more accurate control of the viscous fan clutches offer additional advantages to these manufacturers. Engine control management systems have been incorporated into most automotive and truck vehicles to control emissions, fuel economy as well as other engine operating characteristics. It would be advantageous to have a viscous fan clutch which could be controlled by the engine control management system and provide the ability to variably control the engagement of the clutch and thus the rotation of the fan.

SUMMARY OF THE INVENTION

The present invention provides the art with a viscous fan clutch which utilizes a magnetorheological (MR) fluid to transfer the driving source from the rotor to the stator and thus drive the fan. The MR fluid exhibits substantial increases in flow resistance (viscosity) when it is exposed to a suitable magnetic filed. By having the ability to vary the magnetic field, the present invention provides a viscous fan clutch which provides a variable driving force dependent upon the strength of the magnetic field produced.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 6 is a side elevational view of a viscous fan clutch in accordance with another embodiment of the present invention;

DETAILED DESCRIPTION OF THE PREFERRED EMBODIMENTS

Figure 1:
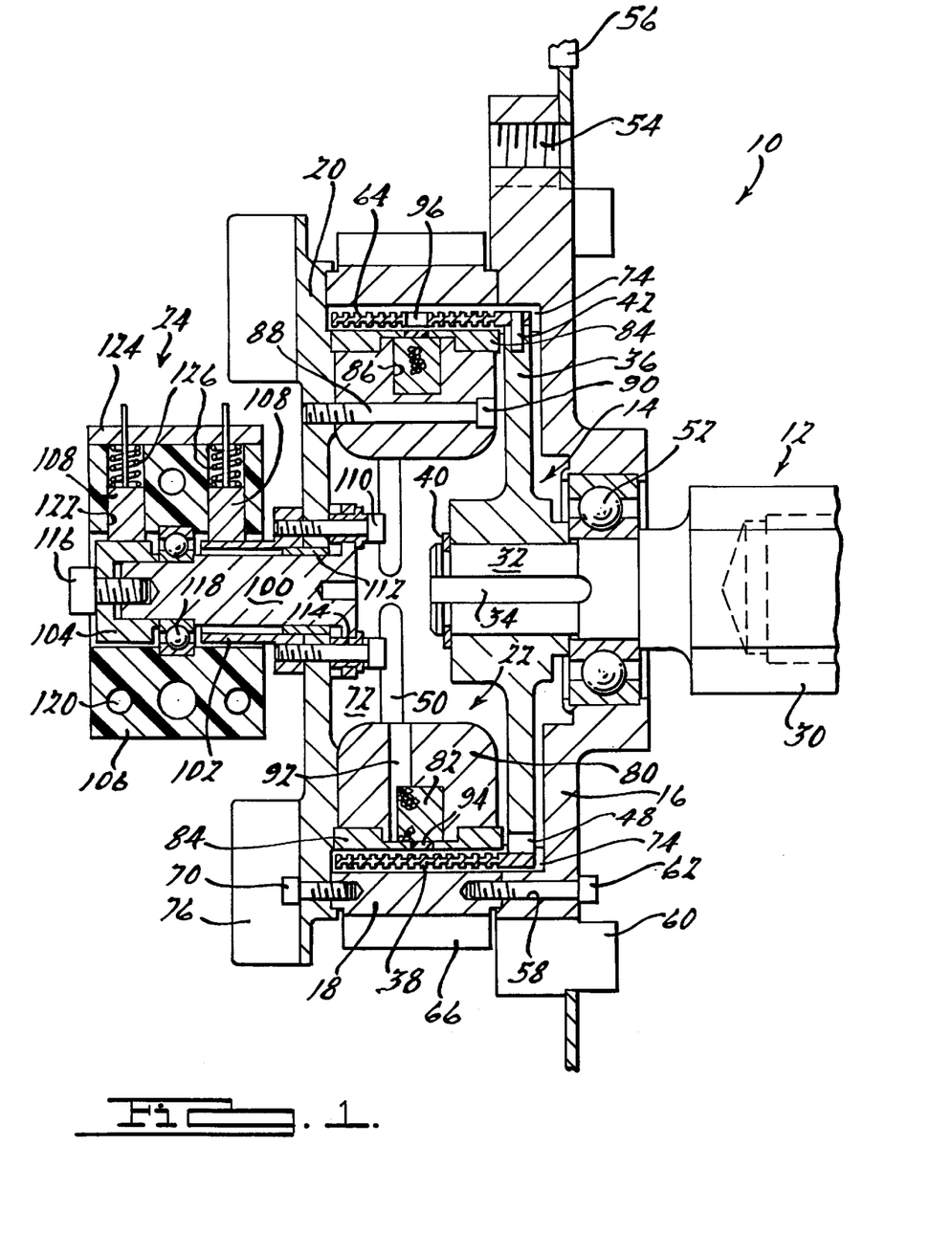
FIG. 1 is a side elevational view in cross section of a viscous fan clutch in accordance with the present invention.
Figure 2:
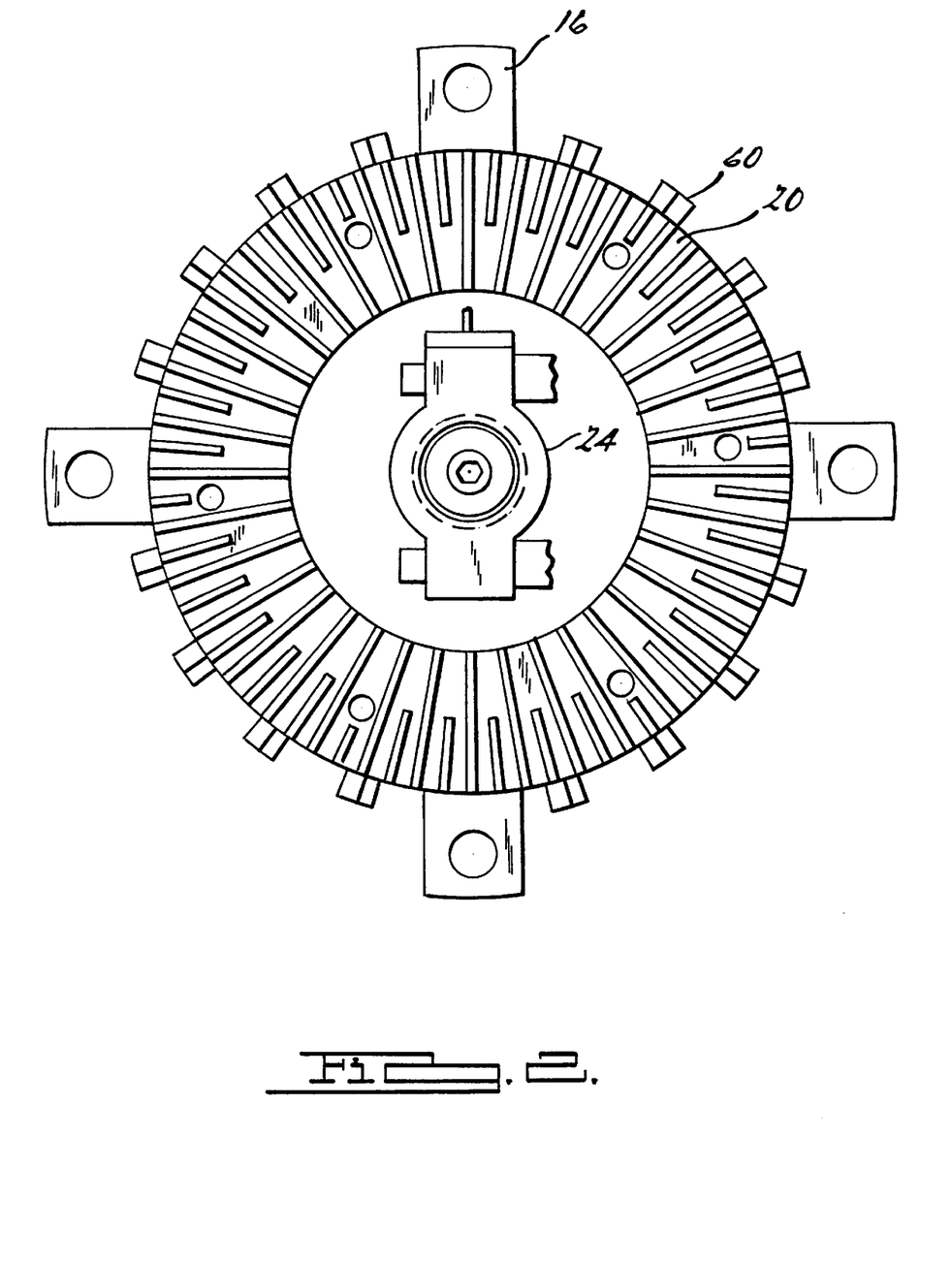
FIG. 2 is a front view of the viscous fan clutch shown in FIG. 1.

There is shown in FIGS. 1 and 2 a viscous fan clutch assembly in accordance with the present invention which is designated generally by the reference numeral 10. Clutch assembly 10 comprises an input shaft 12, a rotor assembly 14, a fan housing 16, a stator 18, a main housing 20, a coil assembly 22 and a slip ring assembly 24. Input shaft 12 is preferably manufactured from steel and is a cylindrical shaft which defines an input end 30 and an output end 32. Input end 30 is adapted to be fixedly secured to an output member of the engine which typically is the water pump. Output end 32 defines a key way 34 which is utilized to drivingly connect input shaft 12 to rotor assembly 14.

Figure 3:
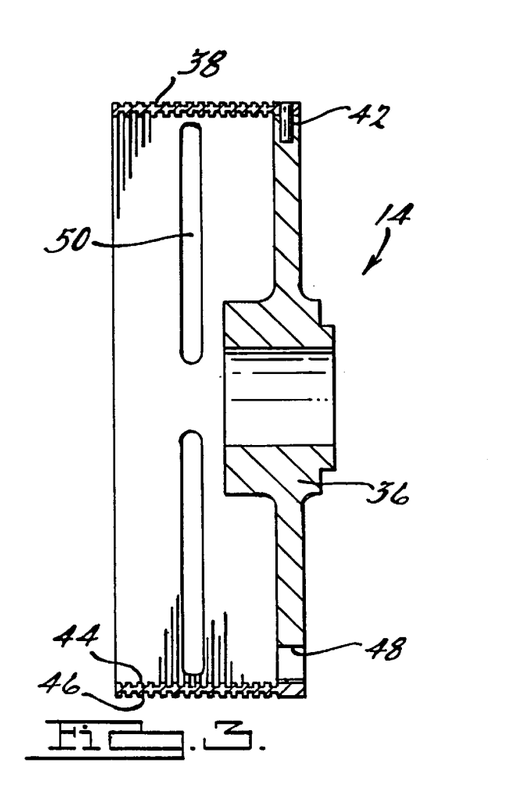
FIG. 3 is a side elevational view in cross section of the rotor assembly for the viscous fan clutch shown in FIG. 1.

Referring now to FIGS. 1 and 3, rotor assembly 14 includes a hub 36 and a rotor 38. Hub 36 is preferably manufactured from aluminum and is attached to output end 32 utilizing a key way (not shown) in hub 36 and a driving key (not shown) located within key way 34 and the key way in hub 36 as is well known in the art. A retaining ring 40 retains hub 36 on input shaft 12. Rotor 38 is preferably manufactured from steel and is fixedly secured to hub 36 using a plurality of dowels 42. The internal cylindrical surface or rotor 38 defines a right handed spiral groove 44 and the external cylindrical surface of rotor 38 defines a left handed spiral groove 46. Grooves 44 and 46 cooperate with a plurality of slots 48 formed in hub 36 to circulate fluid around rotor 38 as will be described later herein. Rotor 38 also defines a plurality of circumferentially extending slots 50 which permit the development of an acceptable magnetic field profile as will be discussed later herein.

Fan housing 16 is preferably manufactured from aluminum and is rotatably secured to input shaft 12 by a bearing 52. Fan housing 16 defines a first plurality of bores 54 which are adapted for securing a fan 56 to housing 16 and a second plurality of bores 58 for securing stator 18 to fan housing 16. Fan housing 16 includes a plurality of fins 60 which are curved as shown in FIGS. 1 and 2. The curvature of fins 60 operate as a fan for creating air flow around rotor assembly 14 and clutch assembly 10 which is located in the central area of fan 56. Fins 60 operate to dissipate heat generated by clutch assembly 10 as well as creating the air flow around clutch assembly 10.

Stator 18 is preferably manufactured from steel and is fixedly secured to fan housing 16 using a plurality of bolts 62. The interior surface of stator 18 is sized to mate with the exterior surface of rotor 38 to define a specified gap 64 between rotor 38 and stator 18. Stator 18 also defines a plurality of fins 66 which operate to dissipate heat generated by clutch assembly 10.

Main housing 20 is preferably manufactured from aluminum and is fixedly secured to stator 18 using a plurality of bolts 70. Main housing 20, stator 18 and fan housing 16 cooperate to define a chamber 72 within which is located rotor assembly 14, coil assembly 22 and magnetorheological fluid 74. Main housing 20 also defines a plurality of fins 76 which operate to dissipate heat generated by clutch assembly 10.

Coil assembly 22 comprises a coil body 80, coil windings 82 and a pair of coil rings 84. Coil body 80 is an annular member preferably manufactured from steel which defines an external groove 86 within which coil windings 82 are disposed. Coil body 80 includes a plurality of axial thru bores 88 which are utilized for securing coil assembly 22 to main housing 20 using a plurality of bolts 90. Coil body 80 further includes a radially extending bore 92 which provides access to windings 82 by slip ring assembly 24. Coil rings 84 are preferably manufactured from steel and are attached to the outer circumference of coil body 80 as is shown in FIG. 1. Coil rings 84 protect coil windings 82 as well as providing a path for the magnetic field. Once assembled to coil body 80, coil rings 84 define a gap 94 which is filled with epoxy. The outer diameter of coil rings 84 mates with the internal diameter of rotor 38 of rotor assembly to define a second specified gap 96.

Slip ring assembly 24 comprises a first slip ring shaft 100, a second slip ring shaft 102, a slip ring cap 104, a slip ring housing 106 and a pair of brushes 108. First and second slip ring shafts 100 and 102 are preferably manufactured from steel and are secured to main housing 20 using a plurality of bolts 110. An insulator 112 is disposed between first slip ring shaft 100 and main housing 20 to electrically insulate first slip ring shaft 100 from housing 20. An insulator 114 is disposed between each bolt 110 and first slip ring shaft 100 to electrically insulate first slip ring shaft 100 from main housing 20 and from second slip ring shaft 102. Second slip ring shaft 102 abuts and electrically communicates with main housing 20. Slip ring cap 104 is secured to the end of first slip ring shaft 102 by a bolt 116.

Slip ring housing 106 is manufactured from an insulating material and is rotatably secured to first slip ring shaft 100 by a bearing 118. Slip ring housing 106 is designed to remain stationary and incudes a plurality of threaded holes 120 which are used to attach slip ring housing 106 to a stationary object. Slip ring housing 106 defines a pair of rectangular bores 122 within each of which is disposed a respective brush 108. A cap 124 is attached to slip ring housing 106 to retain brushes 108. One brush 108 is biased towards slip ring cap 104 by a coil spring 126 and the other brush 108 is biased towards second slip ring shaft 102 by another coil spring 126. First slip ring shaft 100 is connected to one end of coil winding 82 by a connecting wire (not shown) and second slip ring shaft 102 is connected to the other end of coil windings 82 by a connecting wire (not shown). Thus, by supplying power to stationary brushes 108, coil windings 82 are powered to provide the necessary magnetic field.

During assembly of clutch assembly 10, a reduced amount of magnetorheological fluid 74 is required within chamber 72. The amount of fluid 74 which is necessary is the amount of fluid needed to fill gaps 64 and 96. The continued rotation of rotor assembly 14 maintains the distribution of fluid 74 within gaps 64 and 96 due to centrifugal force.

Referring now to FIG. 1, the operation of clutch assembly 10 will be described with clutch assembly first being in a released condition due to a lack of power being supplied to brushes 108. Input shaft 12 and rotor assembly 14 are rotating due to their connection with the output member of the engine. Fan 56 will be stationary or will rotate slowly depending on the viscosity of fluid 74 and the resistance to rotation of fan 56.

Fluid 74 is a magnetorheological (MR) fluid that has the ability to change its flow characteristics by several orders of magnitude and in times on the order of milliseconds under the influence of an applied magnetic field. MR fluids are non-colloidal suspensions of finely divided (typically one to one hundred micron diameter), low coercivity, magnetizable solids such as iron, nickel, cobalt and their magnetic alloys dispensed in a base carrier liquid such as mineral oil, synthetic hydrocarbon, water, silicone oil, esterified fatty acid or other suitable organic liquids. MR fluids have an acceptably low viscosity in the absence of a magnetic field but display large increases in their dynamic yield stress when they are subjected to a magnetic field.

When it is desired to rotate or power fan 56, power is supplied to brushes 108. The timing for supplying power and the amount of power to be supplied is determined by an exterior system which can be part of an engine control management system. As power is supplied to brushes 108, coil assembly 22 is activated and it creates a magnetic field which affects fluid 74 located within gaps 64 and 96. Slots 50 in rotor 38 ensure that the magnetic field created by coil assembly 22 travels through rotor 38 and through stator 18 to affect fluid 74 located within gap 64.

As the viscosity of fluid 74 increases, the shearing of fluid 74 within gaps 64 and 96 will transmit a driving torque from rotating rotor 38 to stator 18 and coil assembly 22. This in turn rotates main housing 20 and fan housing 16 with fan housing 16 rotating fan 56. If sufficient power is provided to coil assembly 22 through brushes 108, a direct drive between rotor assembly 14 and stator 18 and coil assembly 22 can be achieved. When it is desired not to drive fan 56, power to coil assembly 22 is terminated and fluid 74 returns to its low viscosity condition.

One problem which is associated with MR fluid 74 is that the dispersed solids within fluid 74 may have a tendency to migrate out of suspension within the base carrier. Spiral grooves 44 and 46 in conjunction with slots 48 in hub 36 function to maintain a circular movement of fluid 74 within gaps 64 and 96 and around rotor 38 to reduce and/or eliminate any tendency of the dispersed solids to migrate out of suspension with the base carrier.

Figure 4:
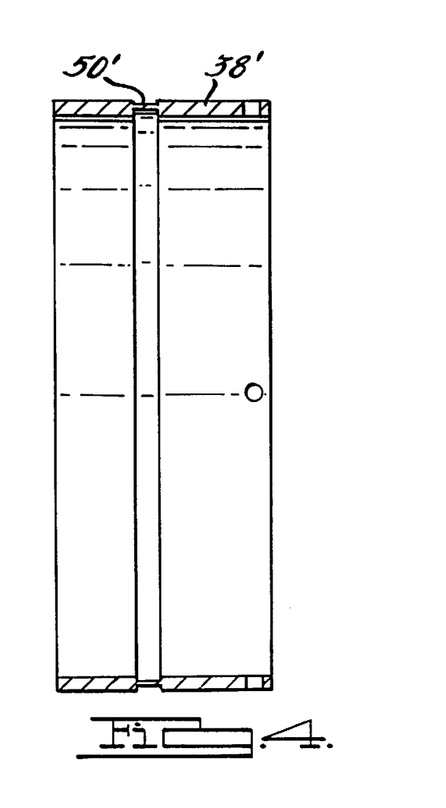
FIG. 4 is a side elevational view in cross section of a rotor in accordance with another embodiment of the present invention.

Referring now to FIG. 4, a rotor 38' in accordance with another embodiment of the present invention is disclosed. Rotor 38' is the same as rotor 38 but the plurality of circumferentially extending slots 50 have been replaced by a thin wall section 50'. Wall section 50' is small enough in thickness such that it does not provide a path to short the development of the magnetic field into gap 64 and stator 18. The function and operation of rotor 38' is identical to that of rotor 38. While rotor 38' in FIG. 4 is shown without spiral grooves 44 and 46, it is to be understood that spiral grooves 44 and 46 can be incorporated into rotor 38' if desired.

Figure 5:
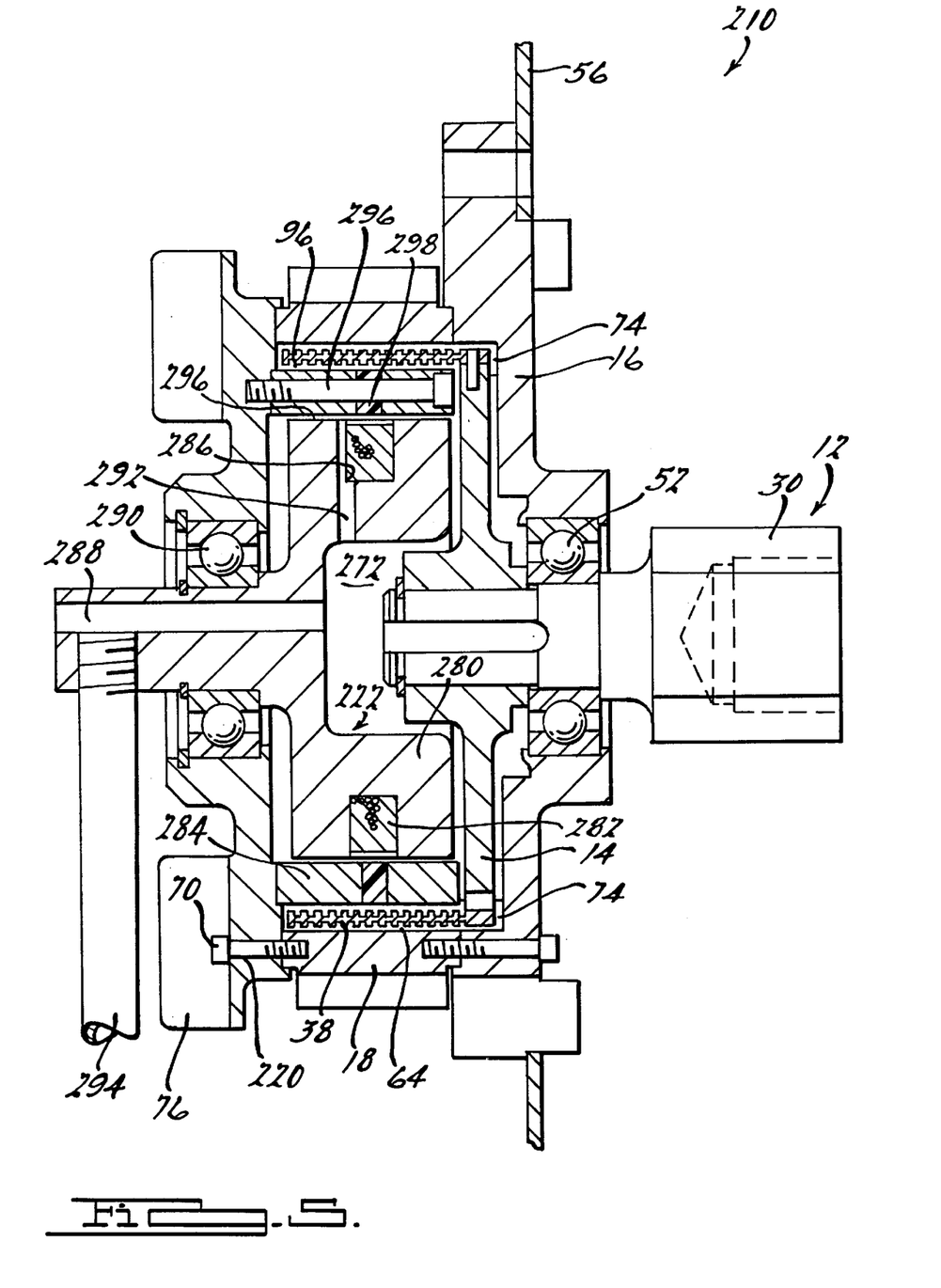
FIG. 5 is a side elevational view in cross section of a viscous fan clutch in accordance with another embodiment of the present invention.

Referring now to FIG. 5, a clutch assembly 210 in accordance with another embodiment of the present invention is disclosed. Components which are the same components as the embodiment shown in FIGS. 1–3 have the same reference numeral. In the embodiment described above for FIGS. 13, coil assembly 22 rotates thus requiring the need for slip ring assembly 24. In some applications, it may be desirable to have a stationary coil assembly.

Clutch assembly 210 comprises input shaft 12, rotor assembly 14, fan housing 16, stator 18, a main housing 220 and a coil assembly 222. Input end 30 of input shaft 12 is adapted to be fixedly secured to an output member of the engine which is typically the water pump. Rotor assembly 14 is rotatably driven by input shaft 12 and thus rotates at engine speed or the speed of the engine's output member. Fan housing 16 is rotatably supported on input shaft 12 by bearing 52. Fan housing 16 secures fan 56 and is secured to stator 18. Gap 64 is defined by stator 18 and rotor 38 of rotor assembly 14.

Main housing 220 is preferably manufactured from aluminum and is fixedly secured to stator 18 using the plurality of bolts 70. Main housing 220, stator 18 and fan housing 16 cooperate to define a chamber 272 within which is located hub assembly 14, coil assembly 222 and magnetorheological fluid 74. Main housing 220 also defines the plurality of fins 76.

Coil assembly 222 comprises a coil body 280, coil windings 282 and a pair of coil rings 284. Coil body 280 is preferably manufactured from steel and is designed to be stationary. A bearing 290 rotatably secures main housing 220 to coil body 280. Coil body 280 defines an external groove 286 within which coil windings 282 are disposed. Coil body 280 includes an axially extending bore 288 and a radially extending bore 292 which provide access to coil windings 282 from the exterior of clutch assembly 210. Coil body 280 is fixedly secured to a stationary object by a rod 294. Coil rings 284 are preferably manufactured from aluminum and are fixedly secured to main housing 220 by a plurality of bolts 296. Thus, coil rings 284 rotate with respect to coil body 280. Coil rings 284 are designed to closely fit with coil body 280 and in the preferred embodiment define a gap 296 which is 0.010" wide. Coil rings 284 are designed to provide a path for the magnetic field and once assembled to main housing 220, coil rings 284 define a gap 298 which is filled with epoxy. The outer diameter of coil rings 284 mate with the internal diameter of rotor 38 to define gap 96.

The operation, function and advantages for clutch assembly 210 are identical to that described above for clutch assembly 10. Clutch assembly 210 offers the added advantage that slip ring assembly 24 can be eliminated due to stationary coil assembly 222.

Referring now to FIG. 6, there is shown a viscous fan clutch assembly in accordance with another embodiment of the present invention which is designated generally by the reference numeral 410. Clutch assembly 410 comprises input shaft 12, rotor assembly 14, fan housing 16, stator 18, a main housing 420, a coil assembly 422 and a slip ring assembly 424.

Main housing 420 is preferably manufactured from aluminum and is fixedly secured to stator 18 using the plurality of bolts 70. Main housing 420, stator 18, coil assembly 422 and fan housing 16 cooperate to define a chamber 472 within which is located hub assembly 14 and a specified amount of magnetorheological fluid 474. Main housing 420 also defines the plurality of fins 76 which operate to dissipate heat generated by clutch assembly 410.

Figures 7, 8, 9:
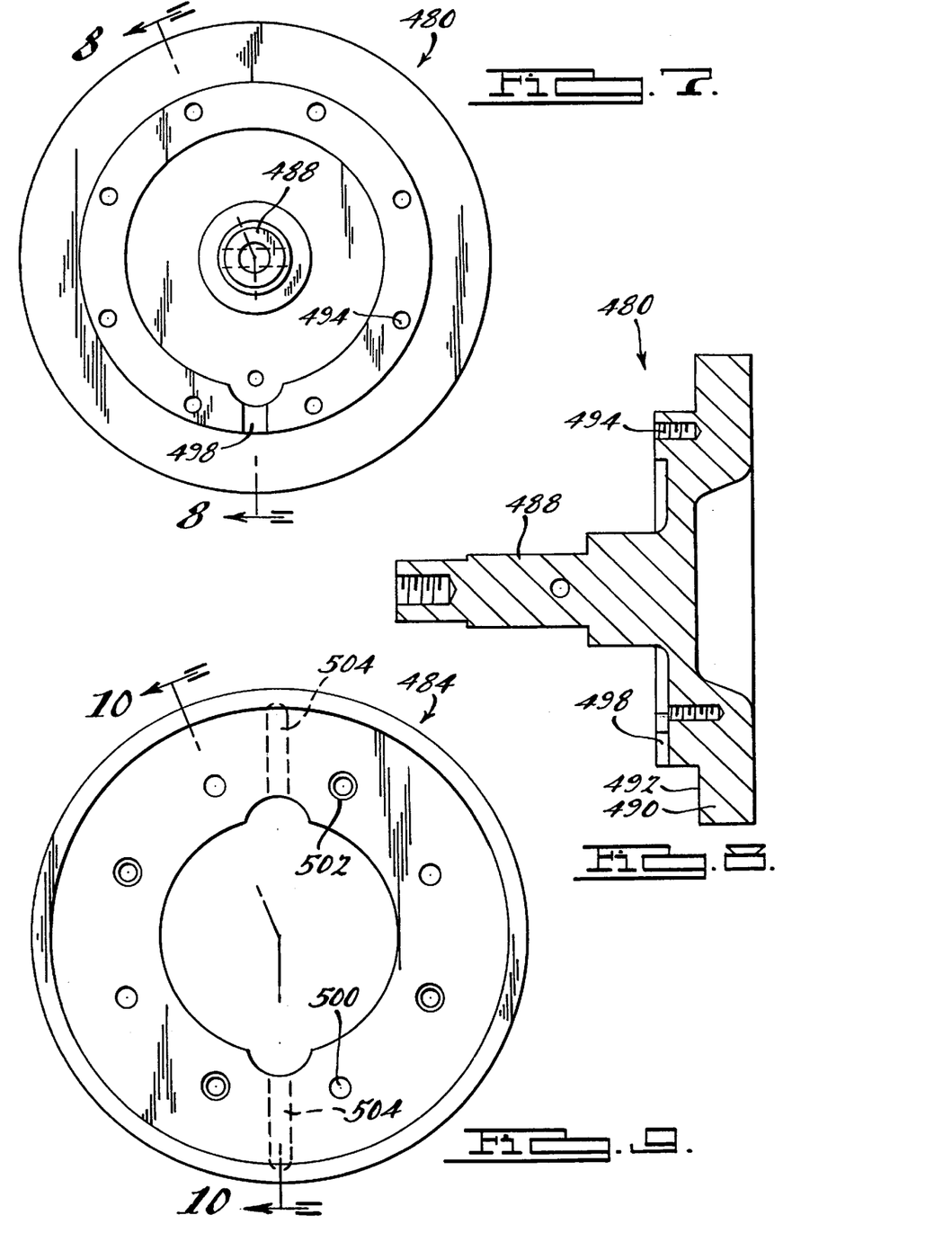
FIG. 7 is a front view of the coil body shown in FIG. 6.
FIG. 8 is a cross-sectional view taken in the direction of arrows 8—8 in FIG. 7.
FIG. 9 is a front view of the coil cover shown in FIG. 9.

Coil assembly 422 comprises a coil body 480, coil windings 82, a coil cover 484 and a bobbin 486. Referring now to FIGS. 7 and 8, coil body 480 is preferably manufactured from steel and it defines a shaft portion 488 and an annular coil support portion 490. Shaft portion 488 extends into slip ring assembly 424 as will be described later herein. Coil support portion 490 defines an annular groove 492 within which bobbin 486 and coil windings 82 are disposed. Coil body 480 defines a plurality of threaded bores 494 which are utilized for securing coil assembly 422 to main housing 420 using a plurality of bolts 496. Coil body 480 further includes a radially extending slot 498 which provides access to windings 82 by slip ring assembly 424.

Figures 10, 11, 12:
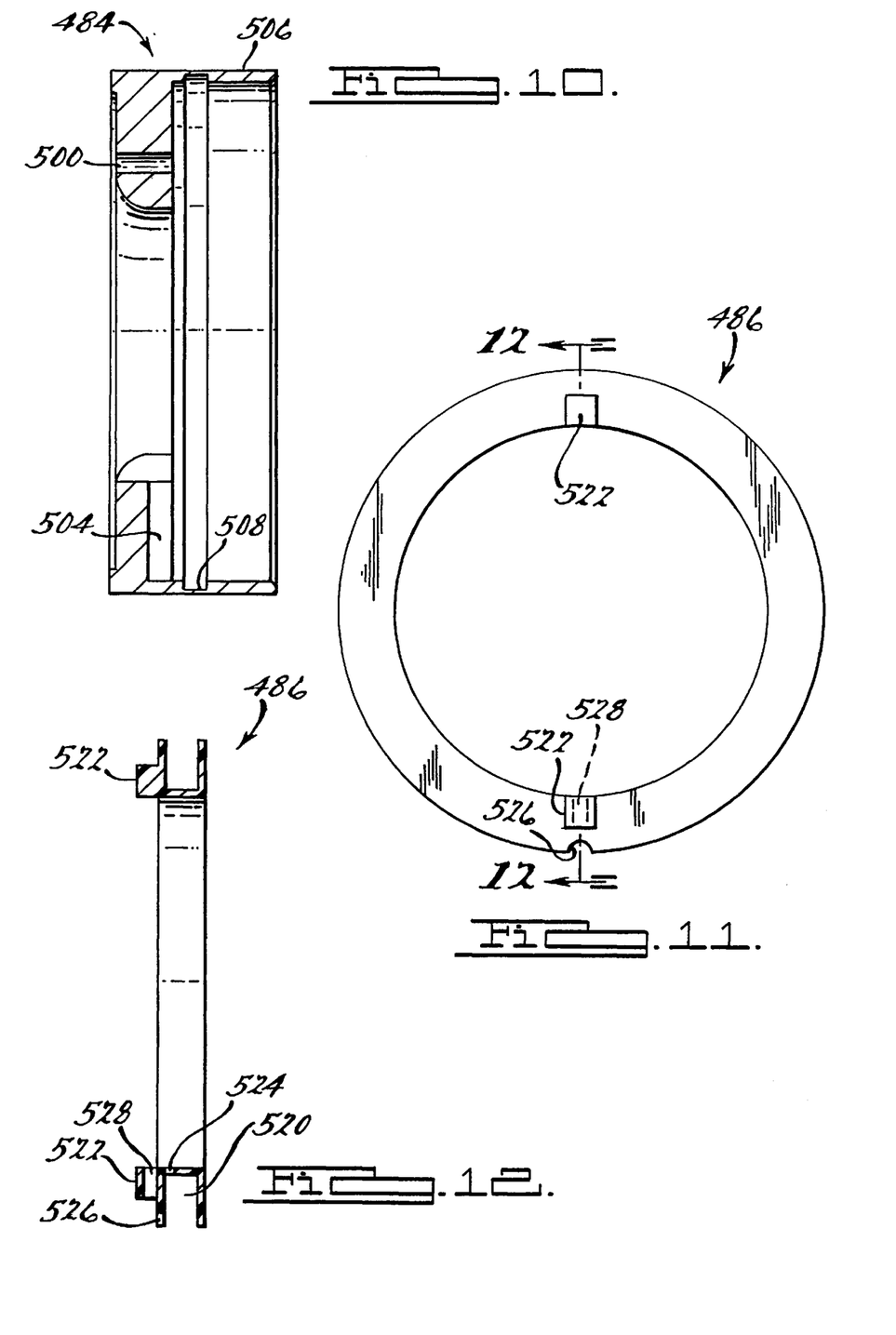
FIG. 10 is a cross-sectional view taken in the direction of arrows 10—10 in FIG. 9.
FIG. 11 is a front view of the bobbin shown in FIG. 6.
FIG. 12 is a cross-sectional view taken in the direction of arrows 12—12 in FIG. 11.

Referring now to FIGS. 9 and 10, coil cover 484 is an annular member preferably manufactured from steel and is utilized to retain coil windings 82 within groove 492 of coil body 480. Coil cover 484 defines a plurality of axial thru bores 500 thru which bolts 496 extend for securing coil assembly 422 to main housing 420. Coil cover 484 also defines a plurality of axially stepped thru bores 502 which are utilized to secure coil cover 484 to coil body 480 using a plurality of socket head cap screws (not shown). Coil cover 484 also includes a pair of radially extending slots 504 which provide access to windings 82 by slip ring assembly 424 and which drive bobbin 486 as will be described later herein. Coil cover 484 further includes an integral annular coil ring 506. Coil ring 506 protects coil windings 82 as well as providing a path for the magnetic field. Coil ring 506 defines a groove 508 which is thin enough to allow for the generation of a magnetic field for affecting magnetorheological fluid 474. The outer diameter of coil ring 506 mates with the internal diameter of rotor 38 of rotor assembly 14 to define a second specified gap 510. The open end of coil ring 506 is designed to be shrink fitted or press fit with the outside diameter of coil body 480 to provide sealing for chamber 472. In this manner, magnetorheological fluid 474 is isolated from coil windings 82 and the electrical connection between coil windings 82 and slip ring assembly 424.

Slip ring assembly 424 is the same as slip ring assembly 424 except that first slip ring shaft 100 has been replaced by shaft portion 488 of coil body 480. Thus, second slip ring 102 has been modified for attachment to shaft portion 488 by bolts 110. Even through second slip ring shaft 102 is attached to shaft portion 488, it is electrically isolated from shaft portion 488 by insulators 112 and 114. Second slip ring 102 is also provided with a threaded bore 512 which is utilized to electrically connect slip ring assembly 424 with coil windings 82 as will be described later herein.

Referring now to FIGS. 11 and 12, bobbin 486 is shown. Bobbin 486 is an annular member manufactured from a high temperature plastic which electrically insulates coil windings 82 from coil body 480 and coil cover 484. Bobbin 486 defines an external groove 520 within which coil windings 82 are disposed. Bobbin 486 also defines two drive lugs 522 each of which mate with a respective groove 504 in coil cover 484. The engagement between drive lugs 522 and grooves 504 ensures a direct drive between bobbin 486 and coil body 480 thus eliminating any tendency for the rotation of bobbin 486 with respect to coil body 480. Bobbin 486 provides two insulated paths for the electrical wiring of coil windings 82 which thus allows coil windings 82 to be connected to slip ring assembly 424. The first path is defined by a radial hole 524 extending through the base of groove 520. The second path is defined by a notch 526 and a radial bore 528 extending through one of drive lugs 522. One of the wires for coil windings 82 extends through hole 524 and is secured to one of the bolts 110 or to threaded bore 512. The second wire for coil windings 82 extends through notch 526 and bore 528 and is secured to the other of one of the bolts 110 or to threaded bore 512. In this manner, coil windings 82 can be energized by stationary brushes 108 to provide the necessary magnetic field.

Similar to clutch assembly 10, clutch assembly 410, at the time of assembly, is provided with a reduced amount of magnetorheological fluid 74 within chamber 472. The amount of fluid necessary is the amount of fluid necessary to fill gaps 64 and 96. Once assembled, the operation of clutch assembly 410 is the same as that for clutch assembly 10 with slot 50 in rotor 38 and groove 508 in coil cover 484 being thin enough to ensure that the magnetic field created coil assembly 422 travels through coil cover 484, rotor 38 and stator 18 to affect fluid 74 located within gap 64.

Coil assembly 422 provides the advantage that all of the electrical components and the wiring 530 between slip ring assembly 424 and coil windings 82 are isolated from magnetorheological fluid 74. This is accomplished by sealing chamber 472. Chamber 472 is sealed by the interface between main housing 420 and coil cover 484, the shrink fit between coil cover 484 and coil body 480, the interface between main housing 420 and stator 18, the interface between stator 18 and fan housing 16 and a seal 532 between rotor assembly 14 and fan housing 16. By isolating the electrical components from fluid 74, the durability of clutch assembly 410 is significantly improved due to reduced leakage of fluid 74 and a reduced amount of deterioration of the electrical components.

While the above detailed description describes the preferred embodiment of the present invention, it should be understood that the present invention is susceptible to modification, variation and alteration without deviating from the scope and fair meaning of the subjoined claims.

What is claimed is:

1. A viscous fluid clutch for a fan assembly, said viscous fluid clutch being movable between an engaged position and a released position, said viscous fluid clutch comprising:

a rotor having an outer cylindrical surface defining a first spiral groove and an inner cylindrical surface defining a second spiral groove;

a stator rotatably supported with respect to said rotor, said stator being adapted to support said fan assembly, said outer cylindrical surface of said rotor and said stator defining a first gap;

a coil assembly disposed adjacent said inner cylindrical surface of said rotor, said inner cylindrical surface of said rotor and said coil assembly defining a second gap;

a viscous fluid disposed within said first and second gaps when said viscous fluid clutch is in said engaged position and when said viscous fluid clutch is in said released position, said rotor transmitting driving torque to said stator by shearing said viscous fluid within said first and second gaps when said viscous fluid clutch is in said engaged position; and means for supplying electrical power to said coil assembly to move said viscous fluid clutch from said released position to said engaged position, said supplying means and said coil assembly being isolated from said viscous fluid.

2. The viscous fluid clutch according to claim 1 wherein said coil assembly comprises a coil body defining a groove and coil windings disposed within said groove.

3. The viscous fluid clutch according to claim 2 wherein said coil assembly further comprises a coil cover secured to said coil body.

4. The viscous fluid clutch according to claim 3 further comprising a bobbin disposed between said coil windings and said coil body.

5. The viscous fluid clutch according to claim 4 wherein said bobbin is drivingly connected to said coil cover.

6. The viscous fluid clutch according to claim 4 wherein said bobbin defines a path between said coil windings and said supplying means.

7. The viscous fluid clutch according to claim 2 further comprising a bobbin disposed between said coil windings and said coil body.

8. The viscous fluid clutch according to claim 7 wherein said bobbin is drivingly connected to said coil body.

9. The viscous fluid clutch according to claim 7 wherein said bobbin defines a path between said coil windings and said supplying means.

10. The viscous fluid clutch according to claim 2 wherein said coil windings are isolated from said viscous fluid.

11. A viscous fluid clutch for a fan assembly, said viscous fluid clutch being movable between an engaged position and a released position, said viscous fluid clutch comprising:

rotor having an outer cylindrical surface defining a first spiral groove and an inner cylindrical surface defining a second spiral groove;

a stator rotatably supported with respect to said rotor, said stator being adapted to support said fan assembly, said outer cylindrical surface of said rotor and said stator defining a first gap;

a coil body fixedly secured to said stator, said coil body defining a groove;

coil windings disposed within said grooves;

a coil cover fixedly secured to said coil body, said inner cylindrical surface of said rotor and said coil cover defining a second gap;

a viscous fluid disposed within said first and second gaps when said viscous fluid clutch is in said engaged position and when said viscous fluid clutch is in said released position, said rotor transmitting driving torque to said stator by shearing said viscous fluid within said first and second gaps when said viscous fluid clutch is in said engaged position; and means for supplying electrical power to said coil assembly to move said viscous fluid clutch from said released position to said engaged position, said supplying means and said coil windings being isolated from said viscous fluid.

12. The viscous fluid clutch according to claim 11 further comprising a bobbin disposed between said coil windings and said coil body.

13. The viscous fluid clutch according to claim 12 wherein said bobbin is drivingly connected to said coil cover.

14. The viscous fluid clutch according to claim 12 wherein said bobbin defines a path between said coil windings and said supplying means.

15. The viscous fluid clutch according to claim 11 wherein said coil windings are isolated from said viscous fluid.

* * * * *